(12) United States Patent
Zhou

(10) Patent No.: US 9,372,368 B2
(45) Date of Patent: Jun. 21, 2016

(54) DISPLAY PANEL, DISPLAY DEVICE USING THE SAME, AND METHOD FOR MANUFACTURING DISPLAY PANEL

(71) Applicant: BOE TECHNOLOGY GROUP CO., LTD., Beijing (CN)

(72) Inventor: Xiaodong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 193 days.

(21) Appl. No.: 14/360,339

(22) PCT Filed: Nov. 18, 2013

(86) PCT No.: PCT/CN2013/087326
§ 371 (c)(1),
(2) Date: May 23, 2014

(87) PCT Pub. No.: WO2014/187088
PCT Pub. Date: Nov. 27, 2014

(65) Prior Publication Data
US 2015/0234223 A1    Aug. 20, 2015

(30) Foreign Application Priority Data

May 24, 2013 (CN) .......................... 2013 1 0197062

(51) Int. Cl.
*G02F 1/1339* (2006.01)
(52) U.S. Cl.
CPC .. *G02F 1/13394* (2013.01); *G02F 2001/13398* (2013.01)

(58) Field of Classification Search
CPC ................................. G02B 27/10; G02F 1/167
USPC ............................................................ 349/155
See application file for complete search history.

(56) References Cited

U.S. PATENT DOCUMENTS

| 2001/0052960 A1 | 12/2001 | Saito et al. |
| 2006/0035559 A1 | 2/2006 | Lee et al. |

FOREIGN PATENT DOCUMENTS

| CN | 1749189 A | 3/2006 |
| CN | 101676775 A | 3/2010 |
| CN | 202486472 U | 10/2012 |

(Continued)

OTHER PUBLICATIONS

First Office Action issued by State Intellectual Property Office of the People's Republic of China for Chinese Patent Application No. 201310197062.1 dated Mar. 17, 2015, 7pgs.

(Continued)

*Primary Examiner* — Lucy Chien
(74) *Attorney, Agent, or Firm* — Ladas & Parry LLP

(57) ABSTRACT

A display panel, a display device using the same, and a method for manufacturing a display panel are provided. The display panel includes a first substrate (25) and a second substrate (26) disposed oppositely, and spacers located between the first substrate (25) and the second substrate (26). Each of the spacers includes a first part (21) and a second part (22) at locations corresponding to each other, the first part (21) is located on the first substrate (25), the second part (22) is located on the second substrate (26), both the first part (21) and the second part (22) are magnetic bodies, and top ends of the first part (21) and the second part (22) at the locations corresponding to each other contact with each other and have opposite magnetic poles.

20 Claims, 1 Drawing Sheet

(56) References Cited

FOREIGN PATENT DOCUMENTS

| | | |
|---|---|---|
| CN | 102998852 A | 3/2013 |
| JP | H10275697 A | 10/1998 |

OTHER PUBLICATIONS

English translation of First Office Action issued by State Intellectual Property Office of the People's Republic of China for Chinese Patent Application No. 201310197062.1 dated Mar. 17, 2015, 6pgs.

English language Abstract of JPH10275697A (listed above in Foreign Patent Documents)I 1 pg.

International Search Report for International Application No. PCT/CN2013/087326, 13pgs.

Written Opinion of the International Searching Authority mailed Mar. 6, 2014; PCT/CN2013/087326.

Second Chinese Office Action dated Sep. 14, 2015; Appln. No. 201310197062.1.

Third Chinese Office Action Appln. No. 201310197062.1; Dated Jan. 25, 2016.

Fourth Chinese Office Action Appln. No. 201310197062.1; Dated Apr. 25, 2016.

DISPLAY PANEL, DISPLAY DEVICE USING THE SAME, AND METHOD FOR MANUFACTURING DISPLAY PANEL

CROSS REFERENCE TO RELATED APPLICATIONS

This application is based on International Application No. PCT/CN2013/087326 filed on Nov. 18, 2013, which claims priority to Chinese National Application No. 201310197062.1 filed on May 24, 2013. The entire contents of each and every foregoing application are incorporated herein by reference.

FIELD OF THE INVENTION

Embodiments of the present invention relate to a display panel, a display device using the same, and a method for manufacturing a display panel.

BACKGROUND

Liquid crystal panel is a main component of a liquid crystal display. As illustrated in FIG. 1, the liquid crystal panel includes an array substrate 11 and a color filter substrate 12 which are cell-assembled, and liquid crystal 13 filled between the array substrate 11 and the color filter substrate 12.

Accuracy and uniformity of the liquid crystal cell thickness are very important to the display quality. For a uniform cell thickness, some spacers 14 need to be disposed between the array substrate 11 and the color filter substrate 12.

In the use of the liquid crystal panel with the spacers 14 as described above, if the liquid crystal panel is pressed by external force, distortion may occur, and the spacers 14 are easy to be shifted laterally, thereby resulting in pixel displacement and light leakage in the pixel.

SUMMARY

One embodiment of the present invention provides a display panel, comprising a first substrate and a second substrate disposed oppositely, and spacers located between the first substrate and the second substrate, wherein, each of the spacers comprises a first part and a second part at locations corresponding to each other, the first part is located on the first substrate, the second part is located on the second substrate, both the first part and the second part are magnetic bodies, and top ends of the first part and the second part at the locations corresponding to each other contact with each other and have opposite magnetic poles.

In one example, first magnetic particles are distributed in the first part, and second magnetic particles are distributed in the second part.

In one example, base material of both the first part and the second part is a resin material, the first magnetic particles and the second magnetic particles are distributed in the resin material, respectively, to form the magnetic bodies.

In one example, the first magnetic particles and the second magnetic particles are permanent magnet material.

In one example, the first magnetic particles and the second magnetic particles are $\gamma-Fe_2O_3$.

In one example, the first magnetic particles and the second magnetic particles have grain diameters of 50-100 nm, respectively.

In one example, one end surface of the first part is fixed to the first substrate, one end surface of the second part is fixed to the second substrate, the other end surface of the first part facing away from the one end surface fixed to the first substrate and the other end surface of the second part facing away from the one end surface fixed to the second substrate contact with each other.

In one example, the end surfaces contacting with each other of the first part and the second part are parallel to planes of the first substrate and the second substrate. In one example, the first part and the second part have a shape of frustum.

Another embodiment of the invention provides a display device, comprising the display panel according to the above embodiments of the invention.

Still another embodiment of the invention provides a method for manufacturing a display panel, comprising: preparing a first substrate and a second substrate; forming a mixture for spacer with magnetic particles contained therein; forming a first part of the spacer on the first substrate by using the mixture; forming a second part of the spacer on the second substrate by using the mixture; cell-assembling the first substrate and the second substrate, such that surfaces of the first substrate and the second substrate having the spacer face each other, and top ends of the first part and the second part at corresponding locations contact with each other, the top ends of the first part and the second part have opposite magnetic poles.

In one example, the step for forming the mixture for spacer comprises: preparing a resin material, magnetic particles and an organic solvent; dissolving the resin material in the organic solvent, dispersing uniformly the magnetic particle in the organic solvent dissolved with the resin material by a stirring manner, to form the mixture for spacer.

In one example, the step for forming the first part of the spacer on the first substrate comprising: by a coating or transfer printing process, applying the mixture for the spacers on a surface of the first substrate to form a first spacer layer; solidifying the first substrate formed with the first spacer layer, and applying a first magnetic field with a field direction from the first substrate to the first spacer layer, to make the magnetic particles in the first spacer layer generate uniform first magnetic distribution while solidifying the first spacer layer; by processing the first spacer layer that has been solidified by a lithographic process, obtaining patterned first part located on the first substrate.

In one example, the step for forming the second part of the spacer on the second substrate comprises: by a coating or transfer printing process, applying the mixture for spacers on a surface of the second substrate, to form a second spacer layer; solidifying the second substrate formed with the second spacer layer, and applying a second magnetic field with a field direction from the second spacer layer to the second substrate, to make the magnetic particles in the second spacer layer generate uniform second magnetic distribution while solidifying the second spacer layer; by processing the second spacer player that has been solidified by a lithographic process, obtaining patterned second part located on the second substrate .

In one example, solidifying temperature in the solidifying process is not higher than Curie temperature of the magnetic particles.

In the display panel, the display device using the same, and the method for manufacturing the display panel according to the embodiments of the present invention, due to the first substrate and the second substrate disposed oppositely, the spacers are located between the first substrate and the second substrate, the spacers include a first part and a second part at locations corresponding to each other, in which, the first part is located on the first substrate, and first magnetic particles are dispersed in the first part; the second part is located on the second substrate, and second magnetic particle are dispersed in the second part; top ends of the first part and the second part at locations corresponding to each other which contact each other have opposite magnetic poles, to enable the first part and the second part to be tightly attracted together. Upon an external force is applied on the first substrate and/or on the second substrate, the first substrate and the second substrate can be kept at a uniform thickness, at the same time, the first part and the second part are hardly be shifted in the lateral direction, thus there is no light leakage occurring in a pixel region. Even if the external force is large enough to generate a shift between the first part and the second part in the lateral direction, the first part and the second part can be soon retrieved to the original location after the external force retracts, a uniform thickness can be kept between the first substrate and the second substrate, and there is also no light leakage occurs in the pixel region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
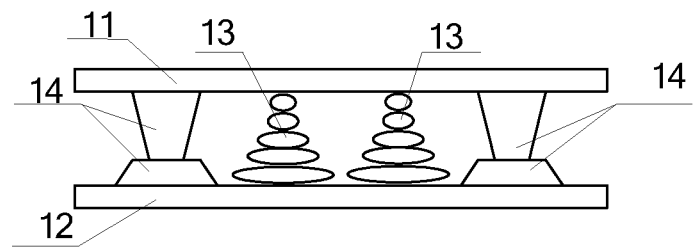
FIG. 1 is a structural view of a liquid crystal panel in the prior art.
Figure 2:
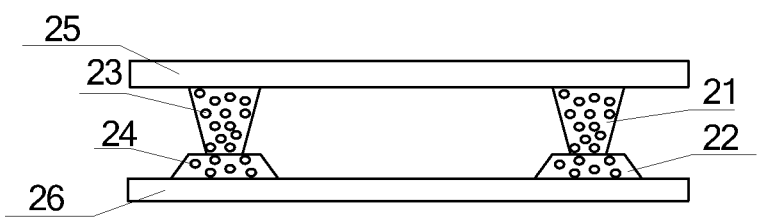
FIG. 2 is a structural view of a display panel provided according to an embodiment of the present invention.
Figure 3:
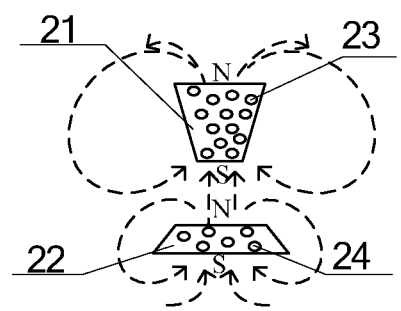
FIG. 3 is a magnetic field view of spacers in the display panel as illustrated in FIG. 2.

According to an embodiment of the present invention, there is provided a display panel, as illustrated in FIG. 2 and FIG. 3, including a first substrate 25, a second substrate 26 disposed opposite to the first substrate 25, and spacers located between the first substrate 25 and second substrate 26. The spacers include a first part 21 and a second part 22 disposed at locations corresponding to each other, the first part 21 is located on the first substrate 25, and first magnetic particles 23 are dispersed in the first part 21; the second part 22 is located on the second substrate 26, and second magnetic particles 24 are dispersed in the second part 22; top ends of the first part 21 and the second part 22 disposed at locations corresponding to each other which contact with each other have opposite magnetic poles.

As illustrated in FIG. 2, one end surface of the first part 21 is fixed to the first substrate 25, one end surface of the second part 22 is fixed to the second substrate 26, the other end surface of the first part 21 facing away from the one end surface fixed to the first substrate 25 and the other end surface of the second part 22 facing away from the one end surface fixed to the second substrate 26 contact with each other.

For example, end surfaces contacting with each other of the first part 21 and the second part 22 are parallel to planes of the first substrate 25 and the second substrate 26.

In an example, both the first part 21 and the second part 22 have the shape of a frustum.

In the display panel provided according to the embodiment of the present invention, due to the first substrate 25 and the second substrate 26 disposed oppositely, the spacers are located between the first substrate 25 and the second substrate 26, the spacers include the first part 21 and the second part 22 at a location corresponding to that of the first part 21. The first part 21 is located on the first substrate 25, and first magnetic particles 23 are dispersed in the first part 21; the second part 22 is located on the second substrate 26, and second magnetic particles 24 are dispersed in the second part 22. Top ends of the first part 21 and the second part 22 disposed at locations corresponding to each other which contact with each other have opposite magnetic poles, to enable the first part 21 and the second part 22 to be attracted closely. Upon an external force is applied on the first substrate 25 and/or the second substrate 26, a uniform thickness between the first substrate 25 and the second substrate 26 can be kept, at the same time, the first part 21 and second part 22 is hardly shifted in the lateral direction, thus there is no light leakage occurred in a pixel region.

Even if the external force is large enough to lead to a shift between the first part 21 and the second part 22 in the lateral direction, the first part 21 and the second part 22 can be soon retrieved to the original location after the external force is removed, so that the uniform thickness between the first substrate 25 and the second substrate 26 can still be kept, and no light leakage occurs in a pixel region.

N and S in FIG. 3 denote north pole and south pole of the magnetic field in the first part 21 and the second part 22, respectively. The black dashed arrow denotes a magnetic induction direction.

As known for those skilled in the art, in a liquid crystal panel, the first substrate and the second substrate can be a color filter substrate and an array substrate; in an OLED panel, the first substrate and the second substrate can be a package substrate and an array substrate.

In the display panel in the embodiments as described above, as illustrated in FIG. 2 and FIG. 3, the first magnetic particles 23 and the second magnetic particles 24 may be permanent magnet material, preferably $\gamma$—$Fe_2O_3$. The permanent magnet material may make the first part 21 and the second part 22 have a strong residual field, or keep a constant magnetic field.

In the display panel in the embodiments as described above, as illustrated in FIG. 2, the first magnetic particles 23 and the second magnetic particles 24 have a preferable particle diameter of 50-100 nm, respectively.

In the display panel in the embodiments as described above, the first part 21 and the second part 22 may be formed of resin material. Preferably, they may be formed of polymethylmethacrylate.

Only a case in which the magnetic particles are mixed in resin material as a base material to form the first part and the second part of the spacers is described above, however, the present invention is not limited thereto. The spacers according to the present invention can also be made of any other suitable magnetic body.

According to another embodiment of the present invention, there is provided a display device, using the display panel described in the foregoing embodiment. The display device may be: liquid crystal panel, electronic paper, OLED panel, mobile phone, tablet computer, TV set, display, notebook computer, digital frame, navigator, and any other products or component with display function.

In the display device provided according to the embodiment of the present invention, due to using the display panel according to the embodiments described above, there is no light leakage occurs in pixel regions under applying external force. Even if there is an overlarge force applied to the display panel, the display panel can be retrieved to the uniform thickness after retracting the external force, there is no light leakage occurs in pixel regions. Resistibility to external force of the display device can be increased.

There is provided a method for manufacturing a display panel according to still another embodiment of the present invention, the method includes steps as following.

401, preparing a first substrate and a second substrate.

402, forming a mixture for spacers. For example, magnetic particles are contained in the mixture.

It is to be noted that step 401 and step 402 can be changed in the sequential order, step 401 is performed firstly, or step 402 is performed firstly, or step 401 and step 402 are performed simultaneity, the display panel as described above can be obtained finally in any case.

403, forming a first part of the spacer on the first substrate by using the mixture as described above. For example, first magnetic particles with a first magnetic distribution are formed in the first part.

404, forming a second part of the spacer on second substrate by using the mixture as described above. For example, second magnetic particles with a second magnetic distribution are formed in the second part.

It is to be noted that step 403 and step 404 can be changed in the sequential order, step 403 is performed firstly, or step 404 is performed firstly, or step 403 and step 404 are performed simultaneity, the display panel as described above can be obtained finally in any case.

405, cell-assembling the first substrate and the second substrate, to make the surfaces of the first substrate and the second substrate with the spacers face each other, the top ends of the first part and the second part disposed at locations corresponding to each other contact with each other, the contacting top ends of the first part and the second part have opposite magnetic poles.

In the method for manufacturing a display panel provided according to the embodiments of the present invention, due to the first substrate and second substrate of the formed display panel disposed oppositely, the spacers are located between the first substrate and the second substrate, each spacer includes the first part and the second part disposed at locations corresponding to each other, the first magnetic particles are dispersed in the first part, the second magnetic particles are dispersed in the second part, top ends of the first part and the second part at corresponding locations have opposite magnetic poles, the first part and the second part can be attracted tightly together. Upon an external force is applied to the first substrate and/or the second substrate, the first substrate and the second substrate can be kept at a uniform thickness, while the first part and second part are hardly shifted in the lateral direction, thus there is no light leakage occurs in the pixel regions. Even if the external force is overlarge so that there is a displacement occurs between the first part and the second part in the lateral direction, the first part and the second part can be retrieved to the original location, the uniform thickness between the first substrate and the second substrate can still be kept, and there is no light leakage occurs in the pixel regions.

In the method for manufacturing the display panel according to the embodiment of the present invention, step 402 may include the steps as following.

501, preparing a resin material, magnetic particles and an organic solvent.

The magnetic particles can be made by a pyrolysis method, a hydro-thermal method, a co-sedimentation method or a mechanical method, is preferably $\gamma$—$Fe_2O_3$. The resin material can use traditional resin material for manufacturing the spacer, is preferably polymethylmethacrylate (PMMA); the organic solvent can use traditional organic solvent for manufacturing the spacer, there is no specifically limited herein.

502, resolving the resin material in the organic solvent, the magnetic particles are dispersed uniformly in the organic solvent resolved with the resin material by a stirring manner, to form a mixture for spacer.

Solid content of the resin material is preferably 6% of the total weight; solid content of the magnetic particles is preferably 0.1% of the total weight.

In the method for manufacturing the display panel provided according to the embodiment as described above, step 403 can include steps as following.

601, by a coating or transfer printing process, applying the mixture for the spacers on a surface of the first substrate to form a first spacer layer.

The coating technology includes spin coating, knife coating, and the like, the spin coating is a technology of rotating the base substrate to be coated around an axis perpendicular to its surface, while coating the liquid coating material on the base substrate. The knife coating is a technology that the liquid coating material is coated on the base substrate to be coated by using a knife or a roller.

602, solidifying the first substrate formed with the first spacer layer, and applying a first magnetic field, to make the magnetic particles in the first spacer layer generate uniform first magnetic distribution while solidifying the first spacer layer. For example, the first magnetic field has a field direction from the first substrate to the first spacer layer.

Specifically, the solidifying process may be performed once time for solidifying the first spacer layer in a solidifying chamber with a magnetic field of certain intensity, and make the magnetic particles in the first spacer layer generate uniform first magnetic distribution; also may first solidify the first spacer layer in a pre-solidifying chamber with a magnetic field of certain intensity, the magnetic field makes the magnetic particles in the first spacer layer generate uniform first magnetic distribution, and then the substrate described above is placed in a main solidifying chamber for further solidifying by heating.

The pre-solidifying chamber and the main solidifying chamber may be the same chamber, may also be two different chambers.

603, by processing the first spacer layer that has been solidified by a lithographic process, obtaining patterned first part located on the first substrate.

Specifically, the lithographic process includes coating photoresist on the solidified first spacer layer, by exposing and developing process using a mask, to form the photoresist into a required pattern, etching the first spacer layer by using the patterned photoresist, obtaining the patterned first part located on the first substrate after peeling off the remaining photoresist. If the mixture for the spacer itself has a photosensitive property, the coating steps of the photoresist, etching process, and peeling off process can be omitted, by directly exposing and developing the first spacer layer using a mask, patterned first part located on the first substrate can be obtained.

In the method for manufacturing the display panel provided according to the embodiments described above, step 404 may include steps as following.

701, by a coating or transfer printing process, applying the mixture for spacers on a surface of the second substrate, to form a second spacer layer.

The coating technology includes spin coating, knife coating, and the like, the spin coating is a technology of rotating the base substrate to be coated around an axis perpendicular to its surface, while coating the liquid coating material on the base substrate. The knife coating is a technology that the liquid coating material is coated on the base substrate to be coated by using a knife or a roller.

702, solidifying the second substrate formed with the second spacer layer, and applying a second magnetic field, the second magnetism is opposite to the first magnetism, to make the magnetic particles in the second spacer layer generate uniform second magnetic distribution while solidifying the second spacer layer. For example, the second magnetic field has a field direction from the second spacer layer to the second substrate.

Specifically, the solidifying process may be performed once time for solidifying the second spacer layer in a solidifying chamber with a magnetic field of certain intensity, and make the magnetic particles in the second spacer layer generate uniform second magnetic distribution; may also first solidify the second spacer layer in a pre-solidifying chamber with a magnetic field of certain intensity, the second magnetic field has a field direction opposite to that of the first magnetic field, the magnetic field makes the magnetic particles in the second spacer layer generate uniform second magnetic distribution, and then the substrate described above is placed in a main solidifying chamber for further solidifying by heating.

The pre-solidifying chamber and the main solidifying chamber may be the same chamber, may also be two different chambers.

In addition, solidification is needed in the step for forming the first part and the second part of the spacer. The pre-solidifying process and the main solidifying process can be performed in different chambers, can also be performed in the same chamber; the solidifying processes of the first part and the second part can be performed in different chambers, can also be performed in the same chamber.

703, by processing the second spacer player that have been solidified by a lithographic process, obtaining patterned second part located on the second substrate.

Specifically, the lithographic process includes coating photoresist on the solidified second spacer layer, by exposing and developing process using a mask, to form the photoresist into a required pattern on the second spacer layer, etching the second spacer layer by using the patterned photoresist, obtaining the patterned second part located on the second substrate after peeling off the remaining photoresist. If the mixture for the spacer itself has a photosensitive property, the coating steps of the photoresist, etching process, and peeling off process, can be omitted, by directly exposing and developing the second spacer layer by using a mask, patterned second part located on the second substrate can be obtained.

In the method for manufacturing the display panel provided according to the embodiments described above, preferably, solidifying temperature in the solidifying process is not higher than the Curie temperature of the magnetic particles, to prevent the magnetism of the magnetic particles from disappearing.

The foregoing is merely exemplary embodiments of the invention, but is not used to limit the protection scope of the invention. The protection scope of the invention shall be defined by the attached claims.

What is claimed is:

1. A display panel, comprising a first substrate and a second substrate disposed oppositely, and spacers located between the first substrate and the second substrate, wherein,
    each of the spacers comprises a first part and a second part at locations corresponding to each other, the first part is located on the first substrate, the second part is located on the second substrate, both the first part and the second part are magnetic bodies, and top ends of the first part and the second part at the locations corresponding to each other contact with each other and have opposite magnetic poles.

2. The display panel according to claim 1, wherein, first magnetic particles are distributed in the first part, and second magnetic particles are distributed in the second part.

3. The display panel according to claim 2, wherein, base material of both the first part and the second part is a resin material, the first magnetic particles and the second magnetic particles are distributed in the resin material, respectively, to form the magnetic bodies.

4. The display panel according to claim 2, wherein, the first magnetic particles and the second magnetic particles are permanent magnet material.

5. The display panel according to claim 4, wherein, the first magnetic particles and the second magnetic particles are γ—$Fe_2O_3$.

6. The display panel according to claim 2, wherein, the first magnetic particles and the second magnetic particles have grain diameters of 50-100 nm, respectively.

7. The display panel according to claim 1, wherein, one end surface of the first part is fixed to the first substrate, one end surface of the second part is fixed to the second substrate, the other end surface of the first part facing away from the one end surface fixed to the first substrate and the other end surface of the second part facing away from the one end surface fixed to the second substrate contact with each other.

8. The display panel according to claim 7, wherein, the end surfaces contacting with each other of the first part and the second part are parallel to planes of the first substrate and the second substrate.

9. The display panel according to claim 1, wherein, the first part and the second part have a shape of a frustum.

10. A display device, comprising the display panel according to claim 1.

11. A method for manufacturing a display panel, comprising:
    preparing a first substrate and a second substrate;
    forming a mixture for spacer with magnetic particles contained therein;
    forming a first part of the spacer on the first substrate by using the mixture;
    forming a second part of the spacer on the second substrate by using the mixture;
    cell-assembling the first substrate and the second substrate, such that surfaces of the first substrate and the second substrate having the spacer face each other, and top ends of the first part and the second part at corresponding locations contact with each other, the top ends of the first part and the second part have opposite magnetic poles.

12. The method for manufacturing the display panel according to claim 11, wherein, the step for forming the mixture for spacer comprises:
    preparing a resin material, magnetic particles and an organic solvent;
    dissolving the resin material in the organic solvent, dispersing uniformly the magnetic particle in the organic solvent dissolved with the resin material by a stirring manner, to form the mixture for spacer.

13. The method for manufacturing the display panel according to claim 11, wherein, the step for forming the first part of the spacer on the first substrate comprising:
   by a coating or transfer printing process, applying the mixture for the spacers on a surface of the first substrate to form a first spacer layer;
   solidifying the first substrate formed with the first spacer layer, and applying a first magnetic field with a field direction from the first substrate to the first spacer layer, to make the magnetic particles in the first spacer layer generate uniform first magnetic distribution while solidifying the first spacer layer;
   by processing the first spacer layer that has been solidified by a lithographic process, obtaining patterned first part located on the first substrate.

14. The method for manufacturing the display panel according to claim 11, wherein, the step for forming the second part of the spacer on the second substrate comprises:
   by a coating or transfer printing process, applying the mixture for spacers on a surface of the second substrate, to form a second spacer layer;
   solidifying the second substrate formed with the second spacer layer, and applying a second magnetic field with a field direction from the second spacer layer to the second substrate, to make the magnetic particles in the second spacer layer generate uniform second magnetic distribution while solidifying the second spacer layer;
   by processing the second spacer player that has been solidified by a lithographic process, obtaining patterned second part located on the second substrate.

15. The method for manufacturing the display panel according to claim 13, wherein, solidifying temperature in the solidifying process is not higher than Curie temperature of the magnetic particles.

16. The display panel according to claim 2, wherein, the first magnetic particles and the second magnetic particles are permanent magnet material.

17. The display panel according to claim 2, wherein, the first magnetic particles and the second magnetic particles have grain diameters of 50-100 nm, respectively.

18. The display panel according to claim 2, wherein, one end surface of the first part is fixed to the first substrate, one end surface of the second part is fixed to the second substrate, the other end surface of the first part facing away from the one end surface fixed to the first substrate and the other end surface of the second part facing away from the one end surface fixed to the second substrate contact with each other.

19. The display panel according to claim 3, wherein, one end surface of the first part is fixed to the first substrate, one end surface of the second part is fixed to the second substrate, the other end surface of the first part facing away from the one end surface fixed to the first substrate and the other end surface of the second part facing away from the one end surface fixed to the second substrate contact with each other.

20. The display panel according to claim 4, wherein, one end surface of the first part is fixed to the first substrate, one end surface of the second part is fixed to the second substrate, the other end surface of the first part facing away from the one end surface fixed to the first substrate and the other end surface of the second part facing away from the one end surface fixed to the second substrate contact with each other.

* * * * *